(12) United States Patent
Kwon et al.

(10) Patent No.: US 12,504,274 B2
(45) Date of Patent: Dec. 23, 2025

(54) SUBSTRATE INSPECTION APPARATUS AND SUBSTRATE INSPECTION METHOD

(71) Applicant: Samsung Display Co., LTD., Yongin-si (KR)

(72) Inventors: Oh June Kwon, Yongin-si (KR); Hyo Jeong Kwon, Yongin-si (KR); Seung Yeon Chae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 281 days.

(21) Appl. No.: 18/371,230

(22) Filed: Sep. 21, 2023

(65) Prior Publication Data

US 2024/0219170 A1 Jul. 4, 2024

(30) Foreign Application Priority Data

Jan. 2, 2023 (KR) ........................ 10-2023-0000171

(51) Int. Cl.
G01B 11/06 (2006.01)
G01B 9/02091 (2022.01)
G01M 11/02 (2006.01)

(52) U.S. Cl.
CPC ...... G01B 11/0675 (2013.01); G01B 9/02091 (2013.01); G01M 11/0228 (2013.01)

(58) Field of Classification Search
CPC ........... G01B 11/0675; G01B 9/02091; G01M 11/0228
See application file for complete search history.

(56) References Cited

U.S. PATENT DOCUMENTS

2005/0259265 A1* 11/2005 De Lega ................ G01N 21/45
356/497

FOREIGN PATENT DOCUMENTS

KR          101015851 B1      2/2011
KR          101733298 B1      5/2017

* cited by examiner

*Primary Examiner* — Georgia Y Epps
*Assistant Examiner* — Don J Williams
(74) *Attorney, Agent, or Firm* — CANTOR COLBURN LLP

(57) ABSTRACT

A substrate inspection apparatus includes an optical coherence tomography (OCT) measuring device which outputs a cross-sectional image generated by optical interference between light radiated onto an organic layer on a substrate and reflected light reflected from the organic layer, a memory which stores one or more instructions and a processor which executes the one or more instructions stored in the memory, where the processor sets a reference line extending from a line in contact with one surface of the substrate, on which the organic layer is not disposed, from the cross-sectional image, measures an optical thickness from a first upper line to a lower line of the organic layer in a first area in the cross-sectional image, measures a physical thickness from the first upper line of the organic layer to the reference line, and calculate a refractive index based on the optical thickness and the physical thickness.

20 Claims, 16 Drawing Sheets

SUBSTRATE INSPECTION APPARATUS AND SUBSTRATE INSPECTION METHOD

This application claims priority to Korean Patent Application No. 10-2023-0000171, filed on Jan. 2, 2023, and all the benefits accruing therefrom under 35 U.S.C. § 119, the content of which in its entirety is herein incorporated by reference.

BACKGROUND

1. Field

The disclosure relates to a substrate inspection apparatus and a substrate inspection method.

2. Description of the Related Art

As an information society develops, the demand for a display device for displaying an image is increasing in various fields. For example, display devices are applied to various electronic devices such as smartphones, digital cameras, laptop computers, navigation devices, and smart televisions.

The display device may be a flat panel display device such as a liquid crystal display device, a field emission display device, or an organic light emitting display device. Among the flat panel display devices, the light emitting display device may include a light emitting element in which each of the pixels of a display panel may emit light by itself, thereby displaying an image without a backlight unit providing the light to the display panel.

The display devices may be subjected to a process of forming a coating layer by applying a thin, transparent polymeric organic material to the surface of a substrate to protect products from an end-use environment (temperature, humidity, foreign substance contamination).

After the process of applying the organic material is performed, an inspection may be performed to check whether the coating layer is evenly applied with a predetermined thickness on the substrate considering that malfunction of the substrate may occur due to poor coating.

SUMMARY

As the thickness inspection of an organic coating layer, a two-dimensional (2D) imaging inspection may be generally performed. The 2D imaging inspection that uses a 2D image of an object may include a 2D fluorescence imaging inspection. However, the 2D imaging inspection may only qualitatively inspect the thickness of the coating layer, and may not measure an exact thickness of the coating layer. In addition, when the coating layer has a thin thickness of about 30 micrometers ($\mu$m) or less, the 2D imaging inspection may be difficult to measure the thickness.

Accordingly, a method using a confocal microscope may be used to effectively inspect the thickness of the coating layer, but the measurement using the confocal microscope may take a lot of time.

Embodiments of the disclosure provide an apparatus and method for obtaining a physical thickness and a refractive index of an organic material layer applied to a substrate using an optical coherence tomography (OCT) technique.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment, a substrate inspection apparatus includes an OCT measuring device which outputs a cross-sectional image generated by optical interference between light radiated onto an organic layer on a substrate and reflected light reflected from the organic layer, a memory which stores one or more instructions and a processor which executes the one or more instructions stored in the memory, where the processor is configured to execute the one or more instructions to set a reference line extending from a line in contact with one surface of the substrate, on which the organic layer is not disposed, in the cross-sectional image, measure an optical thickness from a first upper line to a lower line of the organic layer in a first area in the cross-sectional image, measure a physical thickness from the first upper line of the organic layer to the reference line in the first area in the cross-sectional image, and calculate a refractive index based on the optical thickness and the physical thickness in the first area.

In an embodiment, the first upper line in the first area may include a slope area having an inclination and a smooth area having no inclination, and the processor may be configured to measure the optical thickness in the smooth area.

In an embodiment, the refractive index may be a value obtained by dividing the optical thickness by the physical thickness in the first area.

In an embodiment, the processor may be configured to measure an optical thickness from a second upper line and a lower line of the organic layer in a second area, and calculate the physical thickness based on the optical thickness and the refractive index.

In an embodiment, the processor may be configured to set an interface between air and the organic layer in the cross-sectional image as the first upper line or the second upper line of the organic layer, and set an interface between the organic layer and the substrate as the lower line of the organic layer.

In an embodiment, the processor may be configured to control the OCT measuring device to move from an inspection position in the first area to an inspection position in the second area.

In an embodiment, the first area may be an edge area of the organic layer, and the second area may be an area closer to a center of the organic layer than the first area is.

In an embodiment, the processor may be configured to measure thicknesses corresponding to a plurality of different points of the second area, and calculate the optical thickness in the second area using an average of the measured thicknesses corresponding to the plurality of different points.

In an embodiment, the processor may be configured to measure an angle between a line connecting a starting point and a highest point and the reference line by setting a position where the reference line and the organic layer meet each other as the starting point, and setting a position that maximizes a distance between an interface between air and the organic layer and the reference line as the highest point.

In an embodiment, the substrate may include a light emitting element, and the organic layer may be disposed on the substrate to cover the light emitting element.

According to an embodiment, a substrate inspection method includes outputting, by an OCT measuring device, a cross-sectional image generated by optical interference between light radiated onto an organic layer on a substrate and reflected light reflected from the organic layer, measuring, by a processor, an optical thickness from a first upper line to a lower line of the organic layer in a first area in the cross-sectional image, setting, by the processor, a reference line extending from a line in contact with one surface of the substrate, on which the organic layer is not formed, in the cross-sectional image, measuring, by the processor, a physical thickness from the first upper line of the organic layer to the reference line in the first area in the cross-sectional image, and calculating, by the processor, a refractive index based on the optical thickness and the physical thickness in the first area.

In an embodiment, the first upper line of the first area includes a slope area having an inclination and a smooth area having no inclination, and the measuring the optical thickness from the first upper line to the lower line of the organic layer may include measuring the optical thickness in the smooth area.

In an embodiment, the refractive index may be a value obtained by dividing the optical thickness by the physical thickness in the first area.

In an embodiment, the substrate inspection method may further include measuring, by the processor, a second optical thickness from a second upper line to the lower line of the organic layer in a second area, and calculating, by the processor, the physical thickness in the second area based on the second optical thickness and the refractive index.

In an embodiment, the measuring the second optical thickness may include setting an interface between air and the organic layer in the cross-sectional image as the first upper line or the second upper line of the organic layer, and setting an interface between the organic layer and the substrate as the lower line of the organic layer.

In an embodiment, the measuring of the second optical thickness may further include controlling the OCT measuring device to move from an inspection position in the first area to an inspection position in the second area.

In an embodiment, the first area may be an edge area of the organic layer, and the second area may be an area closer to a center of the organic layer than the first area is.

In an embodiment, the measuring the second optical thickness may include measuring thicknesses corresponding to a plurality of different points of the second area are measured, and measuring the optical thickness in the second area using an average of the measured thicknesses corresponding to the plurality of different points.

In an embodiment, the substrate inspection method may further include measuring, by the processor, an angle between a line connecting a starting point and a highest point and the reference line by setting a position where the reference line and the organic layer meet each other as the starting point, and setting a position that maximizes a distance between an interface between air and the organic layer and the reference line as the highest point.

In an embodiment, the substrate may include a light emitting element, and the organic layer may be disposed on the substrate to cover the light emitting element.

The substrate inspection apparatus and the substrate inspection method according to embodiments of the disclosure may calculate the physical thickness and the refractive index of the organic layer by obtaining a cross-sectional image using the OCT technique. Accordingly, a physical thickness of an organic layer may be checked regardless of a position of the organic layer in an actual product.

However, the effects of the disclosure are not limited to the aforementioned effects, and various other effects are included in the specification.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
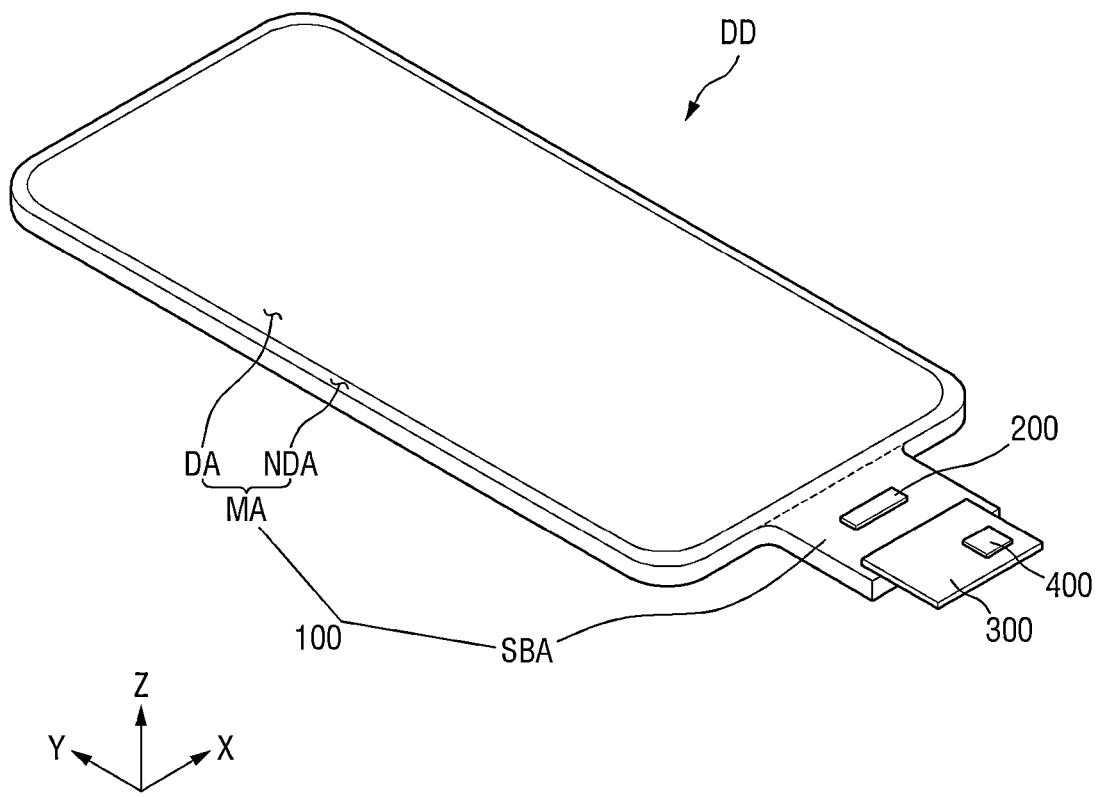
FIG. 1 is a perspective view illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. In the accompanying figures, the thickness of layers and regions may be exaggerated for clarity.

Some of the parts which are not associated with the description may not be provided in order to describe embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from" for the purpose of its meaning and interpretation. For example, "at least one of A and B" or at least one selected from A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
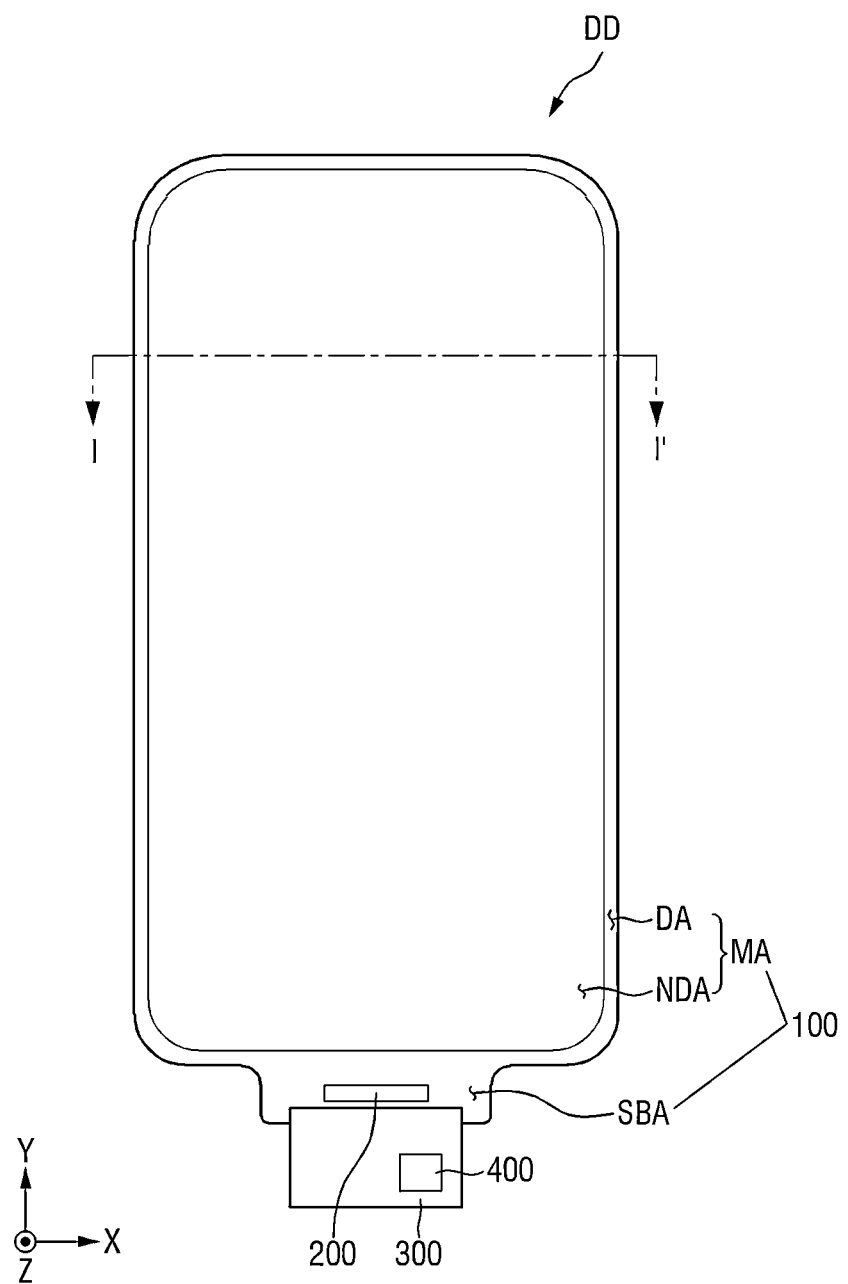
FIG. 2 is a plan view illustrating the display device according to an embodiment.
Figure 3:
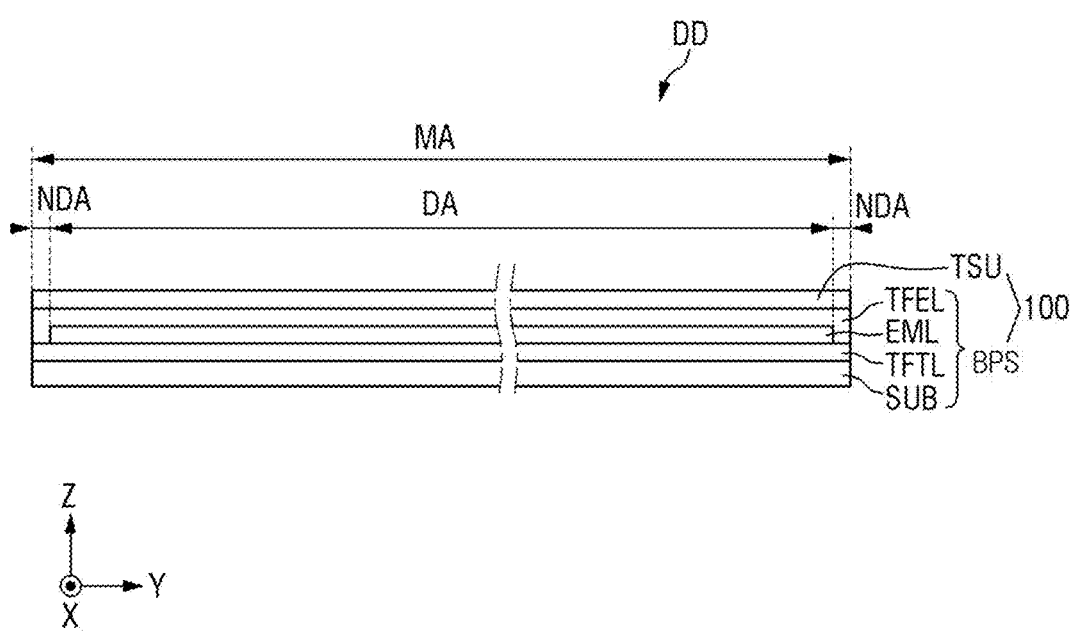
FIG. 3 is a side view illustrating the display device according to an embodiment.

FIG. 1 is a perspective view illustrating a display device according to an embodiment, FIG. 2 is a plan view illustrating the display device according to an embodiment, and FIG. 3 is a side view illustrating the display device according to an embodiment.

Referring to FIGS. 1 to 3, a display device DD according to an embodiment may be applied to portable electronic devices such as a mobile phone, a smartphone, a tablet personal computer (PC), a mobile communication terminal, an electronic notebook, an electronic book, a portable multimedia player (PMP), navigation, and an ultra mobile PC (UMPC). Alternatively, the display device DD according to an embodiment may be applied as a display unit of televisions, laptop computers, monitors, billboards, or the Internet of Things (IOT). Alternatively, the display device DD according to an embodiment may be applied to wearable devices such as a smart watch, a watch phone, a glasses-type display, and a head mounted display (HMD). Alternatively, the display device DD according to an embodiment may be applied to a cluster of a vehicle, a center fascia of a vehicle, a center information display (CID) disposed on a dashboard of a vehicle, a room mirror display substituting for a side mirror of a vehicle, or a display disposed on a rear surface of a front seat as entertainment for a rear seat of a vehicle.

The display device DD according to an embodiment may be light emitting display devices such as an organic light emitting display device using an organic light emitting diode, a quantum dot light emitting display device including a quantum dot light emitting layer, an inorganic light emitting display device including an inorganic semiconductor, and a micro light emitting display device using a micro or nano light emitting diode (micro or nano LED). Hereinafter, for convenience of description, embodiments where the display device DD is the organic light emitting display device will be mainly described, but the disclosure is not limited thereto.

The display device DD according to an embodiment includes a display panel 100, a display driving circuit 200, a display circuit board 300, and a touch driving circuit 400.

The display panel 100 may be formed in a rectangular planar shape having short sides in a first direction (X-axis direction) and long sides in a second direction (Y-axis direction) intersecting the first direction (X-axis direction). A corner where the short side in the first direction (X-axis direction) and the long side in the second direction (Y-axis direction) meet may be rounded to have a predetermined curvature or may be formed at a right angle. The planar shape of the display panel 100 is not limited to the quadrangular shape, and may be other polygonal shapes, a circular shape, or an elliptical shape. In an embodiment, the display panel 100 may be formed to be flat, but is not limited thereto. In an alternative embodiment, for example, the display panel 100 includes curved portions that are formed at left and right distal ends and have a constant curvature or a varying curvature. In addition, the display panel 100 may be flexibly formed to be curved, bent, folded, or rolled.

The display panel 100 includes a main area MA and a sub-area SBA.

The main area MA includes a display area DA for displaying an image and a non-display area NDA which is a peripheral area of the display area DA. The display area DA includes pixels for displaying an image. The sub-area SBA may protrude from one side of the main area MA in the second direction (Y-axis direction).

FIGS. 1 and 2 illustrate an embodiment in a state where the sub-area SBA is unfolded, but the sub-area SBA may be bent, and in this case, the sub-area SBA may be disposed on a lower surface of the display panel 100. When the sub-area SBA is bent, the sub-area SBA may overlap the main area MA in a third direction (Z-axis direction), which is a thickness direction of a support substrate SUB or the display panel 100. The display driving circuit 200 may be disposed in the sub-area SBA.

In an embodiment, the display panel 100 includes a backplane substrate BPS including a support substrate SUB, a thin film transistor layer TFTL, a light emitting element layer EML, and an encapsulation layer TFEL, and a touch sensing unit TSU disposed or formed on a front surface of the backplane substrate BPS, as illustrated in FIG. 3.

The thin film transistor layer TFTL may be disposed on the support substrate SUB. The thin film transistor layer TFTL may be disposed in the main area MA and the sub-area SBA. The thin film transistor layer TFTL includes thin film transistors.

The light emitting element layer EML may be disposed on the thin film transistor layer TFTL. The light emitting element layer EML may be disposed in the display area DA of the main area MA. The light emitting element layer EML includes light emitting elements disposed in light emitting portions.

The encapsulation layer TFEL may be disposed on the light emitting element layer EML. The encapsulation layer TFEL may be disposed in the display area DA and the non-display area NDA of the main area MA. The encapsulation layer TFEL includes at least one inorganic film and at least one organic film for encapsulating the light emitting element layer.

The touch sensing unit TSU may be formed or mounted on the encapsulation layer TFEL. The touch sensing unit TSU may be disposed on the display area DA of the main area MA. The touch sensing unit TSU may sense a touch of a person or an object using touch electrodes.

A cover window for protecting an upper portion of the display panel 100 may be disposed on the touch sensing unit TSU. The cover window may be attached onto the touch sensing unit TSU by a transparent adhesive member such as an optically clear adhesive (OCA) film or an optically clear resin (OCR). The cover window may include or be made of an inorganic material such as glass or an organic material such as plastic or a polymer material. In an embodiment, a polarizing film may be additionally disposed between the touch sensing unit TSU and the cover window to prevent deterioration of visibility of an image due to reflection of external light.

The display driving circuit 200 may generate control signals and data voltages for driving the display panel 100. The display driving circuit 200 may be formed as (or defined by) an integrated circuit (IC) and may be attached onto the display panel 100 by a chip on glass (COG) method, a chip on plastic (COP) method, or an ultrasonic bonding method, but is not limited thereto. In an embodiment, for example, the display driving circuit 200 may be attached onto the display circuit board 300 in a chip on film (COF) method.

The display circuit board 300 may be attached to one end of the sub-area SBA of the display panel 100. Therefore, the display circuit board 300 may be electrically connected to the display panel 100 and the display driving circuit 200. The display panel 100 and the display driving circuit 200 may receive digital video data, timing control signals, and driving voltages through the display circuit board 300. The display circuit board 300 may be a flexible film such as a flexible printed circuit board, a printed circuit board, or a chip on film.

The touch driving circuit 400 may be disposed on the display circuit board 300. The touch driving circuit 400 may be formed as an integrated circuit (IC) and attached to the display circuit board 300.

The touch driving circuit 400 may be electrically connected to the touch electrodes of the touch sensing unit TSU. The touch driving circuit 400 applies touch driving signals to the touch electrodes of the touch sensing unit TSU, and measures an amount of charge change in mutual capacitance of each of a plurality of touch nodes formed by the touch electrodes. In an embodiment, the touch driving circuit 400 measures a change in capacitance of the plurality of touch nodes based on a change in the magnitude of a voltage or the amount of current of a touch sensing signal received through the touch electrodes. In this way, the touch driving circuit 400 may determine whether or not a user's touch is made, whether or not a user's approach is made, and the like, based on the amount of charge change in the mutual capacitance of each of the plurality of touch nodes. The user's touch indicates that a user's finger or an object such as a pen comes into direct contact with one surface of the cover window disposed on the touch sensing unit TSU. The user's approach indicates that the user's finger or the object such as the pen hovers above one surface of the cover window.

The touch driving circuit 400 may extract touch coordinates or switch a driving mode by itself by compensating the touch sensing signals based on a noise application level in a low-temperature driving, a charging mode, a high-frequency application, an electromagnetic noise application state, and the like. in an embodiment, the touch driving circuit 400 may sense a user's touch by selectively changing a touch sensing area based on whether a body portion positioned in a front direction of the display panel 100 is detected, and may also change the driving mode to a low power mode or a standby mode.

Figure 4:
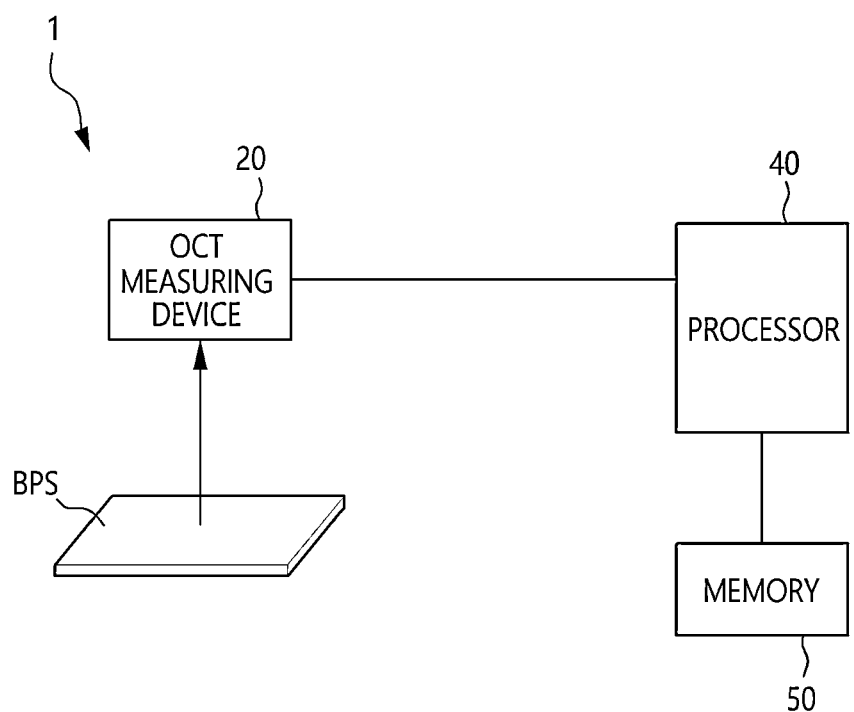
FIG. 4 is a view illustrating a schematic configuration of a substrate inspection apparatus according to an embodiment of the disclosure.

FIG. 4 is a view illustrating a schematic configuration of a substrate inspection apparatus according to an embodiment of the disclosure.

Referring to FIG. 4, a block diagram for describing a configuration of a substrate inspection apparatus according to an embodiment of the disclosure is illustrated.

In an embodiment, a substrate inspection apparatus 1 may inspect a target object to be inspected by adopting an imaging technology that captures an image within the target object by using light interference. In an embodiment, the substrate inspection apparatus 1 may acquire an image representing the inside of the target object in a depth direction from a surface of the target object using optical coherence tomography (OCT). The OCT is generally based on an interferometer, and depth direction resolution of the target object may vary depending on a wavelength of light used in the OCT. When the OCT is used, an image may be obtained by allowing light to more deeply permeate into the target object compared to a confocal microscope, which is another optical technique.

Here, a target object to be inspected may be the backplane substrate BPS described with reference to FIG. 3, but is not limited thereto. The characteristics of the target object to be inspected may include, for example, any one or more of a thickness, a refractive index, or a profile of an organic layer applied on the backplane substrate BPS.

In an embodiment, the substrate inspection apparatus 1 may include an OCT measuring device 20, a processor 40, and a memory 50.

The OCT measuring device 20 obtains optical interference data by an interference phenomenon caused by a difference in characteristics (optical path, wavelength, and the like) between measurement light in which light radiated to the backplane substrate BPS is reflected from the target object and reference light in which the radiated light is reflected from a reference mirror or the like. The OCT measuring device 20 may generate a cross-sectional image based on the optical interference data.

It is possible to clearly identify interfaces of different materials through the cross-sectional image. In an embodiment, for example, an interface between air and the organic layer and an interface between the organic layer and the substrate may be identified. Even when the organic layer is formed in multiple layers, interfaces between organic layers of different materials may be identified. Therefore, even in the case of the organic layer of the multiple layers, the degree of thickness and position of each layer may be identified through the cross-sectional image.

The OCT is based on low coherence interferometry. In conventional interferometers with long coherence lengths (e.g., laser interferometers), light interference occurs over a distance of meters. In the OCT, such interference is reduced to a distance of micrometers due to the use of a wide-bandwidth light source (i.e., a light source that emits light over a wide range of frequencies). By using a high-brightness diode or laser with very short pulses, light with a wide bandwidth may be generated. White light is an example of a low power broadband source.

An output from the OCT measuring device 20 is supplied to the processor 40.

The processor 40 may execute, for example, software (e.g., a program) to control at least one other component (e.g., hardware or software component) of the substrate inspection apparatus 1 connected to the processor 40, and may perform various data processing or calculations. According to an embodiment, as at least portion of the data processing or calculation, the processor 40 may store instructions or data received from other components in the memory 50, process the instructions or data stored in the memory 50, and store resultant data in the memory 50.

The processor 40 may control a measurement position of the OCT measuring device 20 to be moved.

In an embodiment, the processor 40 may obtain a cross-sectional image of the backplane substrate BPS from the OCT measuring device 20 by controlling the OCT measuring device 20 to operate and transmit the OCT measurement light to a currently set inspection position. The processor 40 may obtain a three-dimensional (3D) image from the cross-sectional image. When the 3D image is obtained, the processor 40 may easily check the shape and position where the organic layer is applied on a plane basis.

The processor 40 may measure an optical thickness and a physical thickness of the organic layer of the backplane substrate BPS, which is the target object to be inspected and calculate a refractive index thereof, from the cross-sectional image.

The calculation of the thickness or refractive index of the organic layer of the backplane substrate BPS will be described later in detail with reference to FIGS. 7 to 12.

The processor 40 may include, for example, a field-programmable gate array (FPGA), a digital signal processor (DSP), an application specific integrated circuit (ASIC), one or more general purpose graphics processing units (GPGPUs), a system on a chip (SoC), or a combination thereof.

The memory 50 may store various data. The data stored in the memory 50 is data obtained, processed, or used by at least one component of the substrate inspection apparatus 1, and may include software (e.g., a program).

The memory 50 stores, for example, information on a target area to be inspected for the backplane substrate BPS, which is the target object to be inspected, and various types of information for calculating at least one of the thickness, refractive index, or profile of the organic layer of the backplane substrate BPS.

The memory 50 may include a volatile and/or nonvolatile memory. The memory 50 may store the cross-sectional images generated from the OCT measuring device 20. In addition, the memory 50 may further store information on a profile, information on the thickness, refractive index, or profile, or the like of the organic layer of the backplane substrate BPS derived from the interference image. In addition, the memory 50 may further store position coordinates of the organic layer of the backplane substrate BPS derived from the cross-sectional image and/or information on the thickness and refractive index of the organic layer derived by the processor 40.

Figure 5:
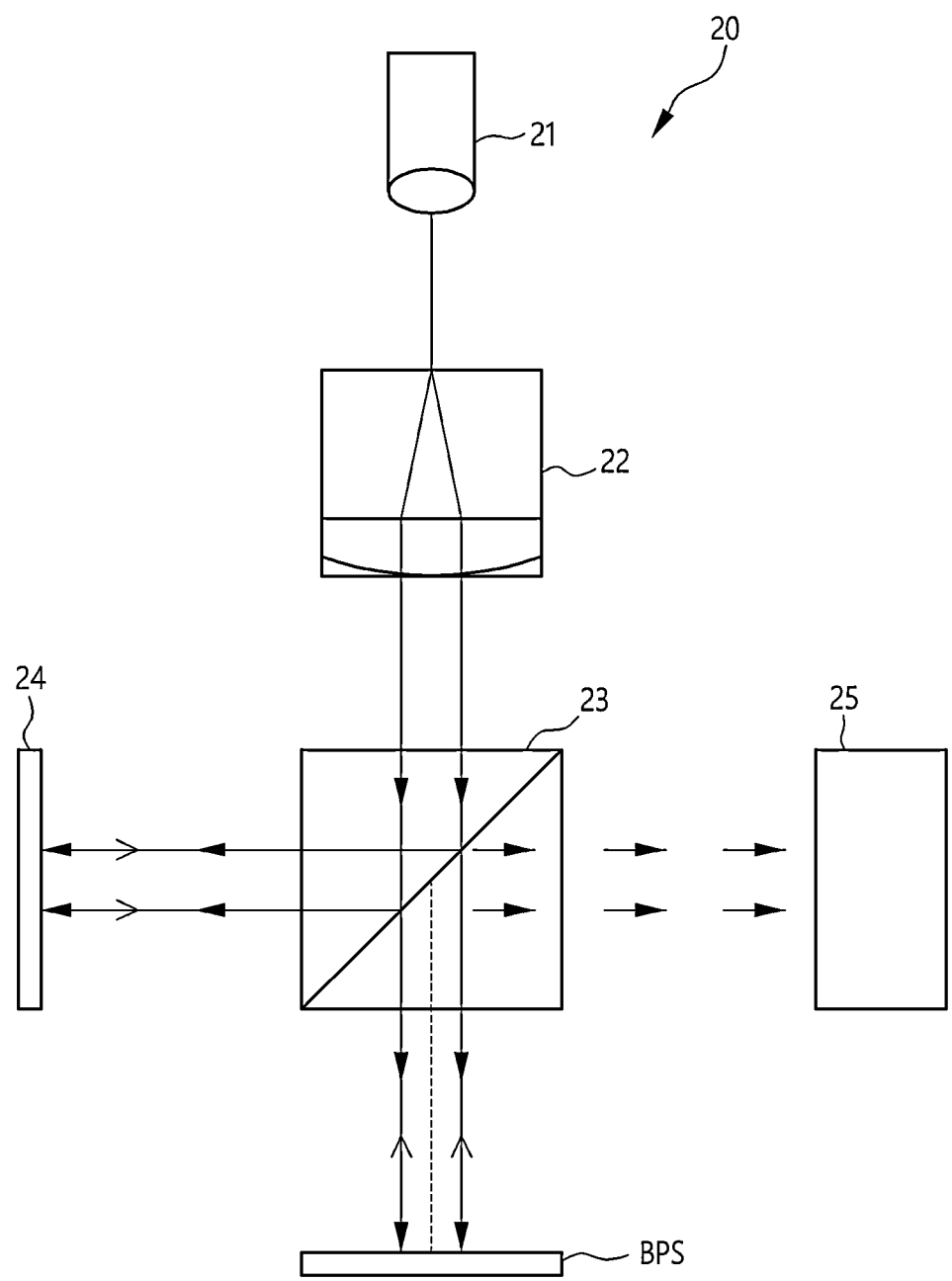
FIG. 5 is a block diagram schematically illustrating a configuration of an OCT measuring device according to an embodiment of the disclosure.

FIG. 5 is a block diagram schematically illustrating a configuration of an OCT measuring device according to an embodiment of the disclosure.

Referring to FIG. 5, an embodiment of the OCT measuring device 20 may include a light source 21, a lens 22, a beam splitter 23, a reference mirror 24, and a light detector 25.

The light source 21 may radiate laser light. In an embodiment, for example, the light source 21 may radiate the laser light toward the beam splitter 23 through the lens 22.

The beam splitter 23 adjusts an optical path of the laser light radiated from the light source 21 through the lens 22.

The beam splitter 23 may pass a portion of the laser light transmitted from the light source 21 to adjust the optical path thereof toward the backplane substrate BPS, and may also reflect another portion of the laser light to adjust the optical path thereof toward the reference mirror 24.

A portion of the laser light whose optical path is adjusted toward the backplane substrate BPS may be reflected by the backplane substrate BPS. As described above, the laser light may be reflected from the surface of the backplane substrate BPS, or may be transmitted from the backplane substrate BPS to a predetermined depth corresponding to a wavelength of the laser light and then be scattered back. Such reflected or scattered light may be referred to as measurement light. The measurement light may be directed toward the beam splitter 23 and transmitted to the light detector 25 by the beam splitter 23.

Another portion of the laser light whose optical path is adjusted toward the reference mirror 24 may be reflected by the reference mirror 24. Such reflected light reflected by the reference mirror 24 may be referred to as reference light. The reference light may pass through the beam splitter 23 and be transmitted to the light detector 25.

The light detector 25 may capture coherent light formed by the measurement light and the reference light. The light detector 25 may capture the coherent light to obtain optical interference data. The processor (40 in FIG. 4) may obtain the optical interference data from the light detector 25 and generate a cross-sectional image of the backplane substrate BPS based on the obtained optical interference data.

The configuration of the OCT measuring device 20 is not limited to that illustrated in FIG. 5, and the OCT measuring device 20 may be implemented by modifying various components and connection shapes capable of generating the cross-sectional image.

Figure 6:
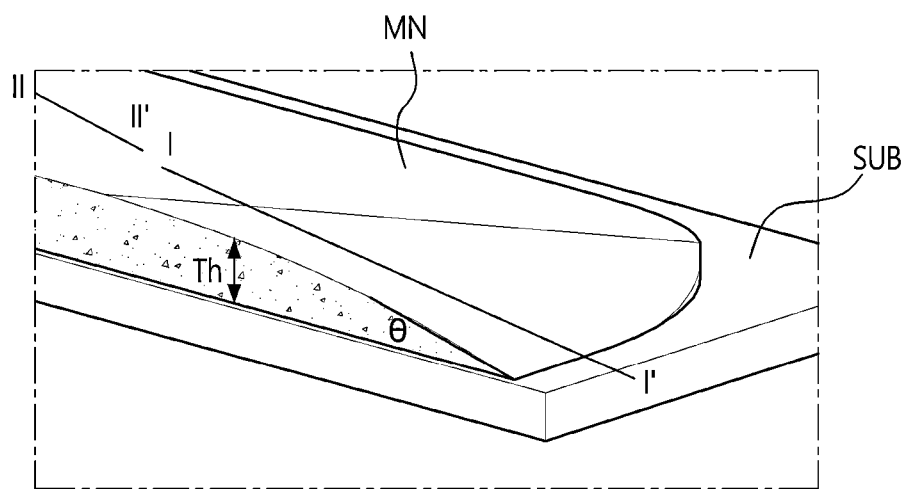
FIG. 6 is a view for describing a backplane substrate according to an embodiment of the disclosure.

FIG. 6 is a view for describing a backplane substrate according to an embodiment of the disclosure.

Referring to FIG. 6, in the backplane substrate, an organic layer MN may be disposed on or applied onto the support substrate SUB. The organic layer MN may have an inclination θ at an edge. The organic layer MN becomes smoother (or more even) towards the center. It is desired to measure a thickness Th of the organic layer MN in a smooth layer (or an even layer).

Next, an operation of a substrate inspection apparatus using an optical interference method according to an embodiment of the disclosure will be described.

Figure 7:
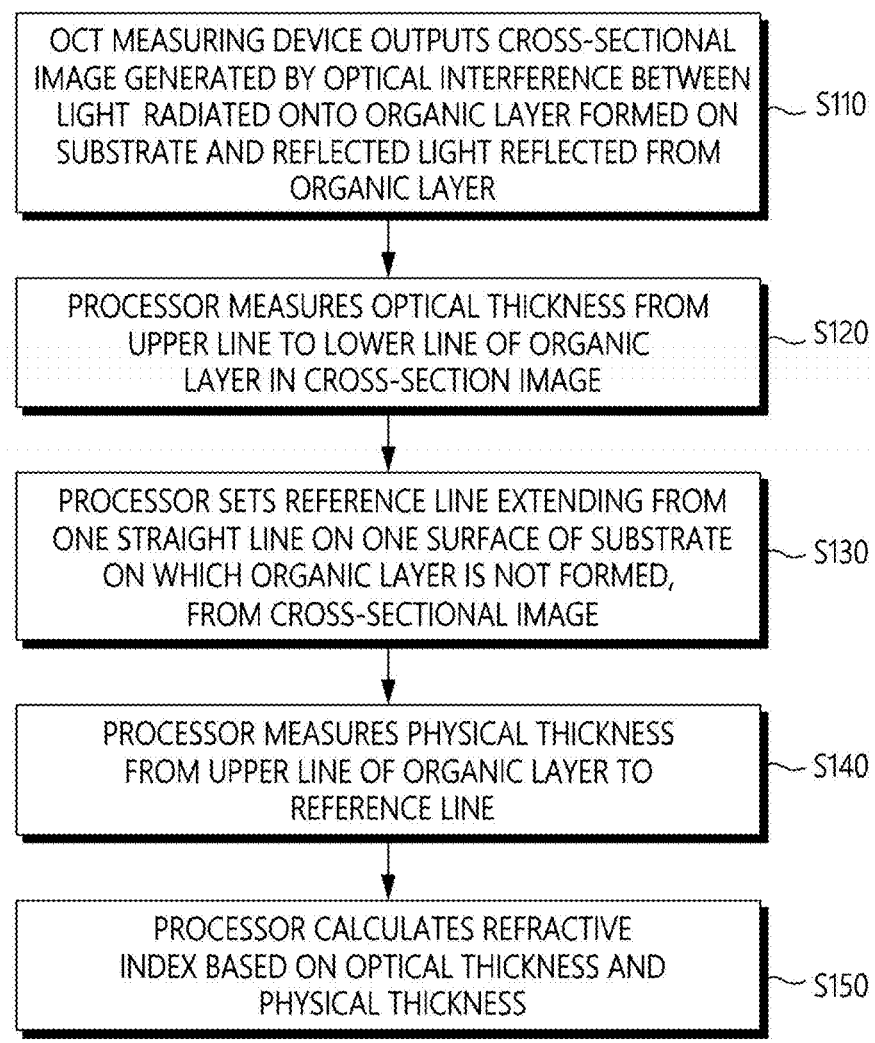
FIG. 7 is a flowchart for describing an operation of a substrate inspection apparatus according to an embodiment of the disclosure.

FIG. 7 is a flowchart for describing an operation of a substrate inspection apparatus according to an embodiment of the disclosure, and FIGS. 8 to 12 are views for describing an execution of substrate inspection from cross-sectional images according to an embodiment of the disclosure.

The operation of the substrate inspection apparatus of FIG. 7 may be performed by the substrate inspection apparatus described with reference to FIGS. 4 and 5.

Figure 8:
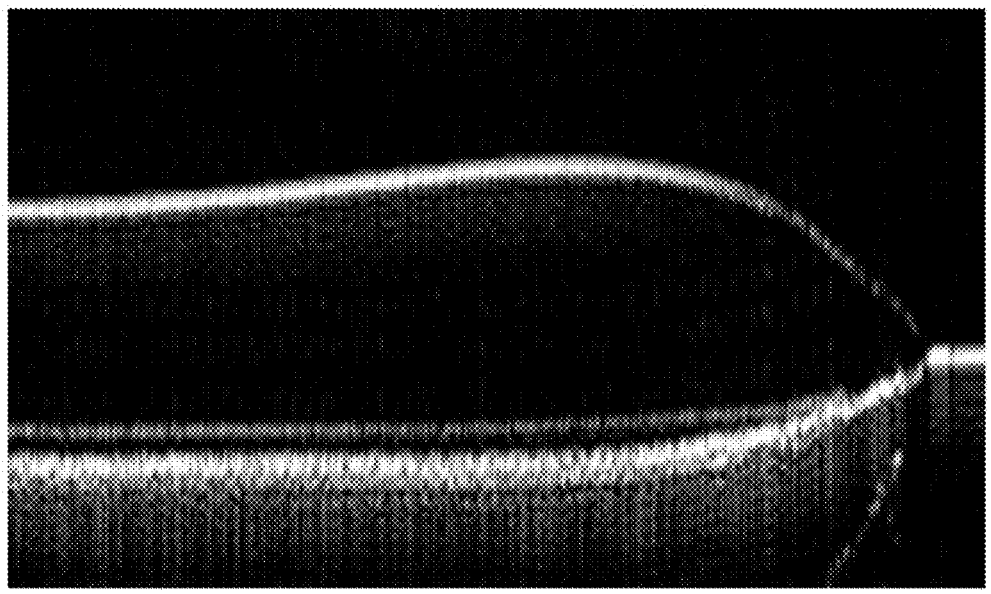
FIGS. 8 to 12 are views for describing an execution of substrate inspection from cross-sectional images according to an embodiment of the disclosure.
Figure 8:
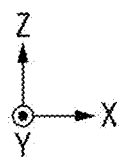

Referring to FIGS. 7 and 8, in process S110, the OCT measuring device 20 outputs a cross-sectional image generated by optical interference between light radiated onto the organic layer MN formed on the substrate BPS and reflected light reflected from the organic layer. The cross-sectional image of FIG. 8 may correspond to a cross-section taken along line I-I' of FIG. 6.

Light is radiated toward the backplane substrate BPS, which is a target substrate to be inspected, and optical interference data generated by the light is obtained.

The OCT has higher resolution than conventional ultrasound images, and may capture the inside of the target object to be inspected in a non-incisional manner. Therefore, real-time tomography is possible.

In addition, the cross-sectional image of FIG. 8 is a two-dimensional (2D) image, but real-time 3D imaging is possible based on a 2D tomographic image.

The optical interference data is a reflection profile and may include information on a spatial dimension and a structure position of the backplane substrate BPS.

A cross-sectional image representing a cross section of the organic layer included in the backplane substrate BPS in a depth direction may be obtained from the optical interference data.

Figure 9:
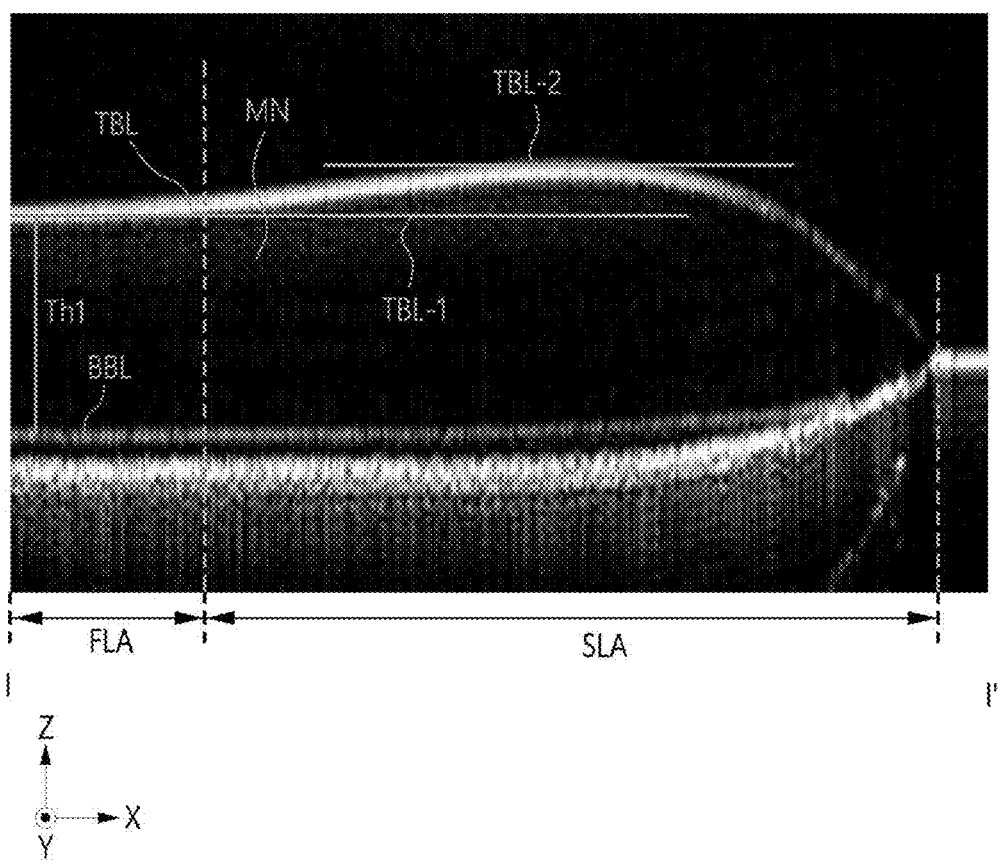

Referring to FIGS. 7 to 9, in process S120, an optical thickness of the organic layer MN may be measured based on the cross-sectional image. An optical thickness Th1 of the organic layer MN is measured by acquiring an upper boundary line TBL of the organic layer MN and a lower boundary line BBL of the organic layer MN on the cross-sectional image.

The organic layer MN includes a slope area SLA having an inclination and a smooth (or even) area FLA having no inclination. A distance between an upper boundary line TBL-1 of the smooth area FLA and a lower boundary line BBL of the organic layer MN is measured as the optical thickness Th1.

Figure 10:
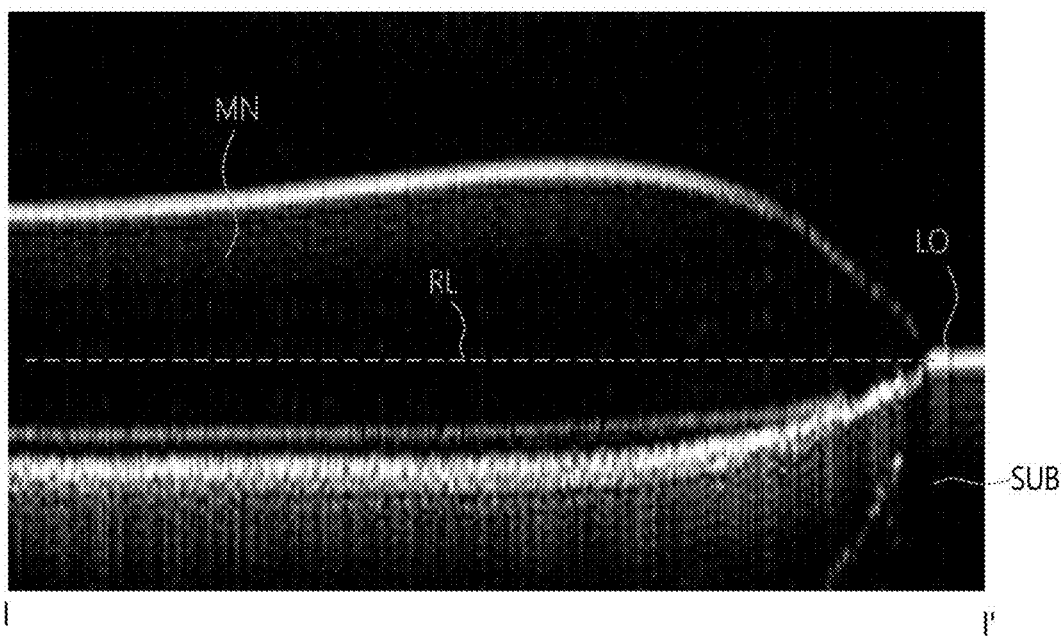

Referring to FIGS. 7 and 10, in process S130, the processor 40 sets a reference line RL extending from a line L0 in contact with one surface of the substrate SUB on which the organic layer MN is not formed, from the cross-sectional image.

The reference line RL is a virtual (or imaginary) line indicating one surface of the substrate SUB when no refraction occurs by the organic layer MN. That is, as more refraction occurs by the organic layer MN, a distance between the reference line RL and the lower boundary line of the organic layer MN may increase.

Figure 11:
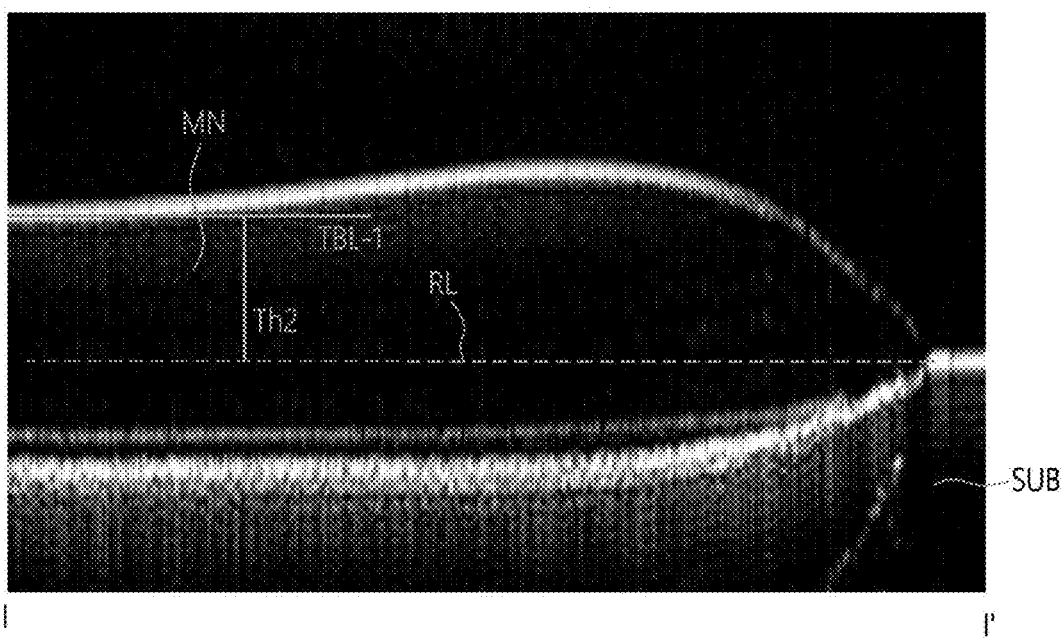
Figure 12:
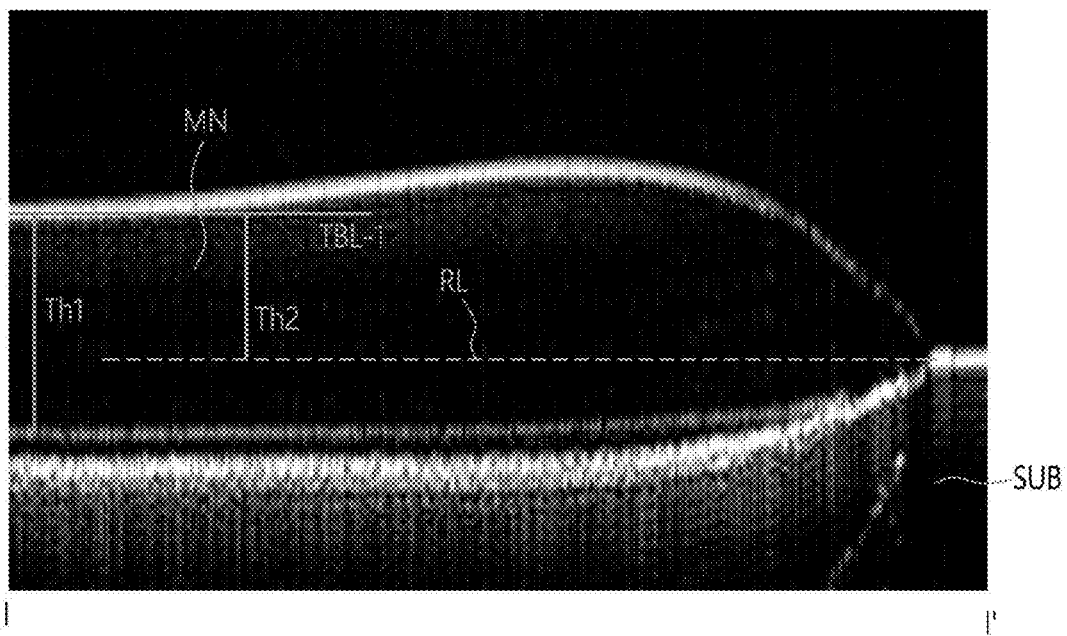

Referring to FIGS. 7, 9, and 11, in process S140, the processor 40 calculates a physical thickness Th2 of the organic layer MN based on the optical thickness Th1 of the organic layer MN.

A distance between the reference line RL generated in process S130 and the upper boundary line TBL-1 of the organic layer MN may be calculated as the physical thickness Th2 of the organic layer MN. As in calculating the optical thickness Th1, the upper boundary line TBL-1 for calculating the physical thickness Th2 is also based on the upper boundary line TBL-1 of the organic layer MN in the smooth area FLA of the organic layer MN.

Referring to FIGS. 7 and 11, in process S150, the processor 40 may calculate a refractive index based on the optical thickness Th1 and the physical thickness Th2 of the organic layer MN.

Since the optical thickness Th1 is a product of the physical thickness Th2 and a refractive index n, the refractive index n of the organic layer MN may be estimated based on the optical thickness Th1 measured in process S120 and the physical thickness Th2 calculated in process S140.

The refractive index n of the organic layer formed on the support substrate SUB may be changed by a process such as curing. Even if the refractive index is changed as described above and an exact refractive index of a material of the organic layer MN is not known, an exact physical thickness Th2 and refractive index n of the organic layer MN may be checked according to an embodiment.

Figure 13:
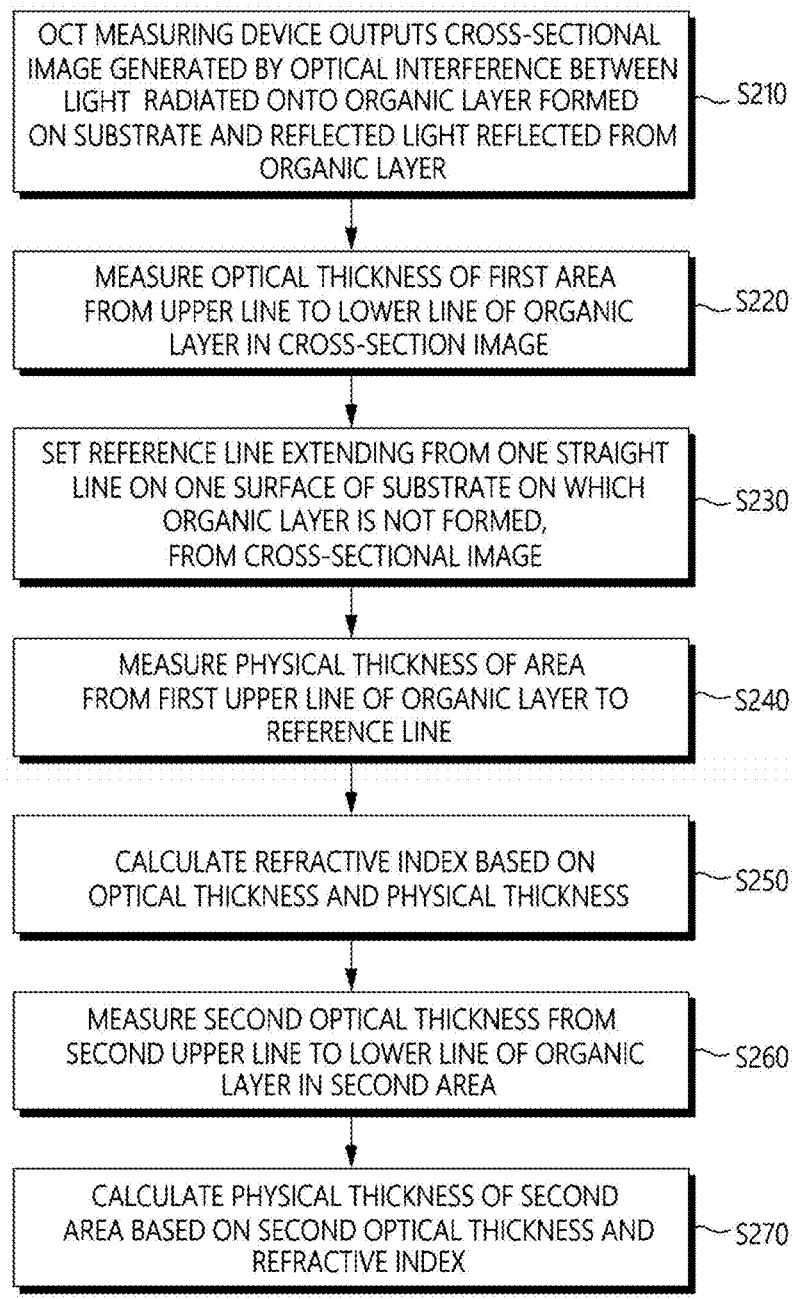
FIG. 13 is a flowchart for describing an operation of a substrate inspection apparatus according to an alternative embodiment of the disclosure.
Figure 14:
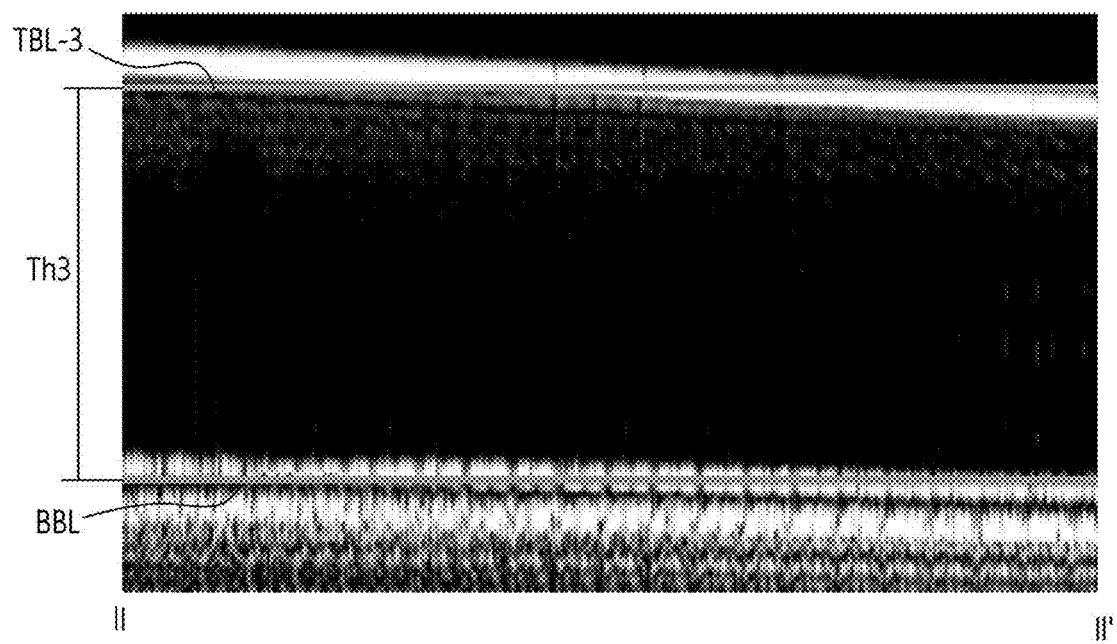
FIG. 14 is a view for describing an optical thickness in a second area.

FIG. 13 is a flowchart for describing an operation of a substrate inspection apparatus according to an alternative embodiment of the disclosure, and FIG. 14 is a view for describing an optical thickness in a second area.

In process S210, the OCT measuring device 20 outputs a cross-sectional image generated by optical interference between light radiated onto the organic layer MN formed on the substrate BPS and reflected light reflected from the organic layer.

A first cross-sectional image and a second cross-sectional image representing cross sections in a depth direction in an edge area (first area) and a central area (second area) of the organic layer MN may be acquired.

The first area is an edge area of the organic layer MN, and the second area is an area closer to the center of the organic layer MN than the first area.

The cross-sectional image of the first area of the organic layer MN may refer to FIG. 8. The cross-sectional image of the second area of the organic layer MN may refer to FIG. 14.

Referring to FIGS. 9 and 13, in process S220, an optical thickness of the organic layer MN in the first area may be measured based on the first cross-sectional image. An optical thickness Th1 of the organic layer MN is measured by acquiring an upper boundary line TBL-1 of the organic layer MN and a lower boundary line BBL of the organic layer MN on the first cross-sectional image.

Referring to FIGS. 10 and 13, in process S230, the processor 40 sets a reference line RL extending from a line L0 in contact with one surface of the substrate SUB on which the organic layer MN is not formed, from the cross-sectional image.

The reference line RL is a virtual line indicating one surface of the substrate SUB when no refraction occurs by the organic layer MN.

Referring to FIGS. 11 and 13, in process S240, a physical thickness Th2 of the organic layer MN is calculated based on the optical thickness Th1 of the organic layer MN in the first area.

A distance between the reference line RL generated in process S230 and the upper boundary line TBL-1 of the organic layer MN may be calculated as the physical thickness Th2 of the organic layer MN. As in calculating the optical thickness Th1, the upper boundary line TBL-1 for calculating the physical thickness Th2 is also based on the upper boundary line TBL-1 of the organic layer MN in the smooth area FLA of the organic layer MN.

In process S250, the processor 40 may calculate a refractive index based on the optical thickness Th1 and the physical thickness Th2 of the organic layer MN in the first area.

Since the optical thickness Th1 is a product of the physical thickness Th2 and a refractive index n, the refractive index n of the organic layer MN may be estimated based on the optical thickness Th1 measured in process S120 and the physical thickness Th2 calculated in process S140.

The refractive index n of the organic layer formed on the support substrate SUB may be changed by a process such as curing. Even if the refractive index is changed as described above and an exact refractive index of a material of the organic layer MN is not known, an exact physical thickness Th2 and refractive index n of the organic layer MN may be checked according to an embodiment.

Referring to FIGS. 13 and 14, in process S260, an optical thickness Th3 of the organic layer MN in a second area between a second upper line TBL-3 and a lower boundary line BBL of the organic layer MN in the second area is measured.

To perform process S260, the processor 40 may control the OCT measuring device 20 to move from an inspection position in the first area to an inspection position of the second area. The inspection position in the second area is positioned closer to the center of the organic layer MN than the inspection position in the first area is.

When the optical thickness Th3 of the organic layer MN in the second area is measured, thicknesses corresponding to a plurality of different points of the second area may be measured, and the optical thickness in the second area may be calculated using an average of the measured thicknesses corresponding to the plurality of different points.

Referring to FIGS. 13 and 14, in process S270, a physical thickness of the second area is calculated based on the optical thickness Th3 of the organic layer MN of the second area.

The physical thickness of the second area may be calculated by dividing the optical thickness Th3 of the organic layer MN of the second area by the refractive index n calculated in process S250.

In this way, the physical thickness in the second area where the reference line may not be detected based on the calculated refractive index in the first area may be calculated.

Figure 15:
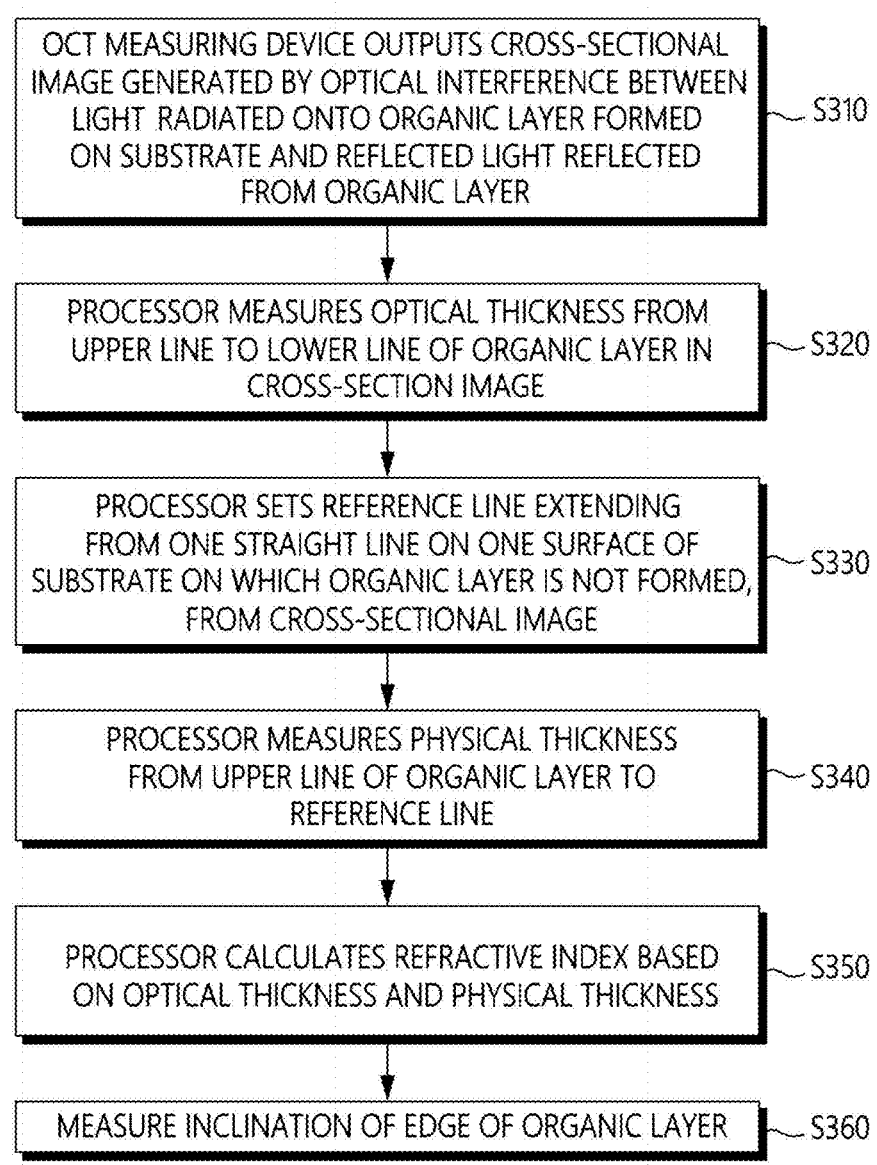
FIG. 15 is a flowchart for describing an operation of a substrate inspection apparatus according to another alternative embodiment of the disclosure.
Figure 16:
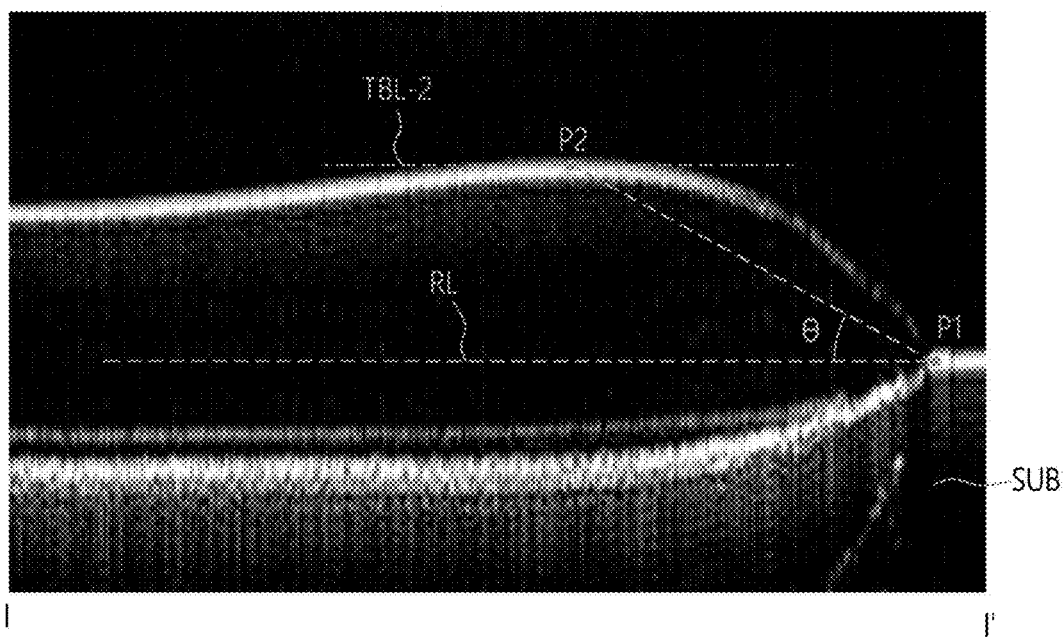
FIG. 16 is a view for describing an inclination of an organic layer.

FIG. 15 is a flowchart for describing an operation of a substrate inspection apparatus according to another alternative embodiment of the disclosure, and FIG. 16 is a view for describing an inclination of an organic layer.

In process S310, the OCT measuring device 20 outputs a cross-sectional image generated by optical interference between light radiated onto the organic layer MN formed on the substrate BPS and reflected light reflected from the organic layer.

A first cross-sectional image and a second cross-sectional image representing cross sections in a depth direction in an edge area (first area) and a central area (second area) of the organic layer MN may be acquired.

The first area is an edge area of the organic layer MN, and the second area is an area closer to the center of the organic layer MN than the first area.

The cross-sectional image of the first area of the organic layer MN may correspond to FIG. 8. The cross-sectional image of the second area of the organic layer MN may correspond to FIG. 14.

Referring to FIGS. 9 and 15, in process S320, an optical thickness of the organic layer MN in the first area may be measured based on the first cross-sectional image. An optical thickness Th1 of the organic layer MN is measured by acquiring an upper boundary line TBL-1 of the organic layer MN and a lower boundary line BBL of the organic layer MN on the first cross-sectional image.

Referring to FIGS. 10 and 15, in process S330, the processor 40 sets a reference line RL extending from a line L0 in contact with one surface of the substrate SUB on which the organic layer MN is not formed, from the cross-sectional image.

The reference line RL is a virtual line indicating one surface of the substrate SUB when no refraction occurs by the organic layer MN.

Referring to FIGS. 11 and 15, in process S340, a physical thickness Th2 of the organic layer MN is calculated based on the optical thickness Th1 of the organic layer MN in the first area.

A distance between the reference line RL generated in step S330 and the upper boundary line TBL-1 of the organic layer MN may be calculated as the physical thickness Th2 of the organic layer MN. As in calculating the optical thickness Th1, the upper boundary line TBL-1 for calculating the physical thickness Th2 is also based on the upper boundary line TBL-1 of the organic layer MN in the smooth area FLA of the organic layer MN.

In process S350, the processor 40 may calculate a refractive index based on the optical thickness Th1 and the physical thickness Th2 of the organic layer MN in the first area.

Since the optical thickness Th1 is a product of the physical thickness Th2 and a refractive index n, the refractive index n of the organic layer MN may be estimated based on the optical thickness Th1 measured in process S120 and the physical thickness Th2 calculated in process S140.

The refractive index n of the organic layer MN formed on the support substrate SUB may be changed by a process such as curing. Even if the refractive index is changed as described above and an exact refractive index of a material of the organic layer MN is not known, an exact physical thickness Th2 and refractive index n of the organic layer MN may be checked according to an embodiment.

Referring to FIGS. 15 and 16, in process S360, an inclination θ of the edge of the organic layer MN is measured.

The processor 40 sets a position where the reference line RL and the organic layer MN meet as a starting point P1. An angle between a line connecting one point P2 of an interface TBL-2 between air and the organic layer MN and the starting point P1 and the reference line RL may be measured as the inclination θ of the organic layer MN.

One point P2 of the interface TBL-2 between the air and the organic layer MN may be the highest point that maximizes a distance between the interface TBL-2 and the reference line RL.

As described above, according to an embodiment, the physical thickness, refractive index, and inclination of the organic layer of the actual product may be calculated using the OCT technique.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A substrate inspection apparatus comprising:
an optical coherence tomography measuring device which outputs a cross-sectional image generated by optical interference between light radiated onto an organic layer on a substrate and reflected light reflected from the organic layer;
a memory which stores one or more instructions; and
a processor which executes the one or more instructions stored in the memory,
wherein the processor is configured to execute the one or more instructions to:
set a reference line extending from a line in contact with one surface of the substrate, on which the organic layer is not disposed, in the cross-sectional image,
measure an optical thickness from a first upper line to a lower line of the organic layer in a first area in the cross-sectional image,
measure a physical thickness from the first upper line of the organic layer to the reference line in the first area in the cross-sectional image, and
calculate a refractive index based on the optical thickness and the physical thickness in the first area.

2. The substrate inspection apparatus of claim 1, wherein the first upper line in the first area includes a slope area having an inclination and a smooth area having no inclination, and
the processor is configured to measure the optical thickness in the smooth area.

3. The substrate inspection apparatus of claim 1, wherein the refractive index is a value obtained by dividing the optical thickness by the physical thickness in the first area.

4. The substrate inspection apparatus of claim 3, wherein the processor is configured to:
measure an optical thickness from a second upper line and the lower line of the organic layer in a second area in the cross-sectional image, and
calculate the physical thickness in the second area based on the optical thickness in the second area and the refractive index.

5. The substrate inspection apparatus of claim 4, wherein the processor is configured to:
set an interface between air and the organic layer in the cross-sectional image as the first upper line or the second upper line of the organic layer, and
set an interface between the organic layer and the substrate as the lower line of the organic layer.

6. The substrate inspection apparatus of claim 4, wherein the processor is configured to control the optical coherence tomography measuring device to move from an inspection position in the first area to an inspection position in the second area.

7. The substrate inspection apparatus of claim 6, wherein the first area is an edge area of the organic layer, and
the second area is an area closer to a center of the organic layer than the first area is.

8. The substrate inspection apparatus of claim 4, wherein the processor is configured to:
measure thicknesses corresponding to a plurality of different points in the second area, and
calculate the optical thickness in the second area using an average of the measured thicknesses corresponding to the plurality of different points.

9. The substrate inspection apparatus of claim 1, wherein the processor is configured to measure an angle between a line connecting a starting point and a highest point and the reference line by setting a position where the reference line and the organic layer meet each other as the starting point, and setting a position that maximizes a distance between an interface between air and the organic layer and the reference line as the highest point.

10. The substrate inspection apparatus of claim 1, wherein the substrate includes a light emitting element, and
the organic layer is disposed on the substrate to cover the light emitting element.

11. A substrate inspection method comprising:
outputting, by an optical coherence tomography measuring device, a cross-sectional image generated by optical interference between light radiated onto an organic layer on a substrate and reflected light reflected from the organic layer;
measuring, by a processor, an optical thickness from a first upper line to a lower line of the organic layer in a first area in the cross-sectional image;
setting, by the processor, a reference line extending from a line in contact with one surface of the substrate, on which the organic layer is not disposed, in the cross-sectional image;

measuring, by the processor, a physical thickness from the first upper line of the organic layer to the reference line in the first area in the cross-sectional image; and calculating, by the processor, a refractive index based on the optical thickness and the physical thickness in the first area.

12. The substrate inspection method of claim 11, wherein the first upper line in the first area includes a slope area having an inclination and a smooth area having no inclination, and the measuring the optical thickness from the first upper line to the lower line of the organic layer includes measuring the optical thickness in the smooth area.

13. The substrate inspection method of claim 11, wherein the refractive index is a value obtained by dividing the optical thickness by the physical thickness in the first area.

14. The substrate inspection method of claim 13, further comprising:

measuring, by the processor, a second optical thickness from a second upper line to the lower line of the organic layer in a second area; and calculating, by the processor, the physical thickness in the second area based on the second optical thickness and the refractive index.

15. The substrate inspection method of claim 14, wherein the measuring the second optical thickness includes setting an interface between air and the organic layer in the cross-sectional image as the first upper line or the second upper line of the organic layer, and setting an interface between the organic layer and the substrate as the lower line of the organic layer.

16. The substrate inspection method of claim 14, wherein the measuring the second optical thickness further includes controlling the optical coherence tomography measuring device to move from an inspection position in the first area to an inspection position in the second area.

17. The substrate inspection method of claim 16, wherein the first area is an edge area of the organic layer, and the second area is an area closer to a center of the organic layer than the first area is.

18. The substrate inspection method of claim 14, wherein the measuring the second optical thickness includes measuring thicknesses corresponding to a plurality of different points in the second area, and measuring the optical thickness in the second area using an average of the measured thicknesses corresponding to the plurality of different points.

19. The substrate inspection method of claim 11, further comprising:

measuring, by the processor, an angle between a line connecting a starting point and a highest point and the reference line by setting a position where the reference line and the organic layer meet each other as the starting point, and setting a position that maximizes a distance between an interface between air and the organic layer and the reference line as the highest point.

20. The substrate inspection method of claim 11, wherein the substrate includes a light emitting element, and the organic layer is disposed on the substrate to cover the light emitting element.

* * * * *